(12) United States Patent
Alexander (10) Patent No.: US 8,848,035 B2
(45) Date of Patent: Sep. 30, 2014

(54) DEVICE FOR GENERATING THREE DIMENSIONAL SURFACE MODELS OF MOVING OBJECTS

(75) Inventor: Eugene J. Alexander, San Clemente, CA (US)

(73) Assignee: Motion Analysis Corporation, Santa Rosa, CA (US)

( * ) Notice: Subject to any disclaimer, the term of this patent is extended or adjusted under 35 U.S.C. 154(b) by 1665 days.

(21) Appl. No.: 11/543,364

(22) Filed: Oct. 4, 2006

(65) Prior Publication Data

US 2007/0076090 A1    Apr. 5, 2007

Related U.S. Application Data

(60) Provisional application No. 60/723,903, filed on Oct. 4, 2005.

(51) Int. Cl.
*H04N 13/00* (2006.01)
*H04N 13/02* (2006.01)
*G06T 17/00* (2006.01)

(52) U.S. Cl.
CPC ............ *G06T 17/00* (2013.01); *H04N 13/0242* (2013.01); *H04N 13/0239* (2013.01); *H04N 13/0275* (2013.01); *H04N 13/0253* (2013.01); *G06T 2207/10012* (2013.01)
USPC .......................................................... 348/42

(58) Field of Classification Search
CPC ................................................... H04N 13/0239
USPC ............................................ 348/42; 382/154
See application file for complete search history.

(56) References Cited

U.S. PATENT DOCUMENTS

| 3,965,753 | A | 6/1976 | Browning, Jr. |
| 4,639,878 | A | 1/1987 | Day et al. |
| 4,965,667 | A | 10/1990 | Trew et al. |
| 5,008,804 | A | 4/1991 | Gordon et al. |
| 5,268,998 | A | 12/1993 | Simpson |
| 5,495,576 | A | 2/1996 | Ritchey |
| 5,745,126 | A | 4/1998 | Jain et al. |

(Continued)

FOREIGN PATENT DOCUMENTS

| EP | 1 408 702 A2 | 4/2004 |
| WO | 9735166 A1 | 9/1997 |

(Continued)

OTHER PUBLICATIONS

Grau O et al: "A Combined Studio Production System for 3-D Capturing of Live Action and Immersive Actor Feedback" IEEE Transactions on Circuits and Systems for Video Technology, IEEE Service Center, Piscataway, NJ, US LNKD-DOI:10.1109/TCSVT.2004. 823397, vol. 14, No. 3, Mar. 1, 2004, pp. 370-380, XP011108802 ISSN: 1051-8215.

(Continued)

*Primary Examiner* — Geepy Pe
*Assistant Examiner* — James Pontius
(74) *Attorney, Agent, or Firm* — Manatt, Phelps & Phillips, LLP (57) ABSTRACT

A device and method for producing a model of the surface of one aspect of a three dimensional object. The model is produced by extracting a three dimensional mesh from a pattern projected on the object. The three dimensional object maybe in motion.

20 Claims, 7 Drawing Sheets

(56) References Cited

U.S. PATENT DOCUMENTS

| | | | |
|---|---|---|---|
| 5,852,672 | A | 12/1998 | Lu |
| 5,889,550 | A | 3/1999 | Reynolds |
| 6,114,824 | A | 9/2000 | Watanabe |
| 6,377,298 | B1 | 4/2002 | Sheele et al. |
| 6,380,732 | B1 | 4/2002 | Gilboa |
| 6,519,359 | B1 | 2/2003 | Nafis et al. |
| 6,594,600 | B1 | 7/2003 | Arnoul et al. |
| 6,768,509 | B1 | 7/2004 | Bradski et al. |
| 6,788,333 | B1 | 9/2004 | Uyttendaele et al. |
| 6,816,187 | B1 | 11/2004 | Iwai et al. |
| 6,819,789 | B1 | 11/2004 | Kantor |
| 7,274,388 | B2 | 9/2007 | Zhang |
| 7,295,698 | B2 * | 11/2007 | Miyoshi et al. ............... 382/154 |
| 7,403,853 | B1 | 7/2008 | Janky et al. |
| 7,630,537 | B2 * | 12/2009 | Sato et al. ..................... 382/154 |
| 2001/0030744 | A1 | 10/2001 | Chang |
| 2002/0050988 | A1 * | 5/2002 | Petrov et al. .................. 345/418 |
| 2002/0164066 | A1 * | 11/2002 | Matsumoto .................... 382/154 |
| 2002/0184640 | A1 | 12/2002 | Schnee et al. |
| 2003/0085992 | A1 | 5/2003 | Arpa et al. |
| 2003/0235331 | A1 * | 12/2003 | Kawaike et al. ............. 382/154 |
| 2004/0128102 | A1 | 7/2004 | Petty et al. |
| 2004/0223077 | A1 | 11/2004 | Said et al. |
| 2005/0136819 | A1 | 6/2005 | Kriesel |
| 2005/0168381 | A1 | 8/2005 | Stephens |
| 2005/0225640 | A1 | 10/2005 | Sadano |
| 2006/0290695 | A1 | 12/2006 | Salomie |

FOREIGN PATENT DOCUMENTS

| | | | | |
|---|---|---|---|---|
| WO | 9742601 | A1 | 11/1997 | |
| WO | 9810246 | A1 | 3/1998 | |
| WO | 00/00926 | A1 | 1/2000 | |
| WO | 00/27131 | A2 | 5/2000 | |
| WO | 03044734 | A2 | 5/2003 | |
| WO | 2004/106856 | A1 | 12/2004 | |
| WO | WO 2004/109228 | * | 12/2004 | ............ G01B 11/24 |
| WO | 2005065283 | A2 | 7/2005 | |

OTHER PUBLICATIONS

Grau O et al: "The Origami Project: Advanced tools for creating and mixing real and virtual content in film and TV production Visual media production" IEE Proceedings: Vision, Image and Signal Processing, Institution of Electrical Engineers, GB LNKD-DOI:10.1049/IP-VIS:20045134, vol. 152, No. 4, Aug. 5, 2005, pp. 454-469, XP006024838 ISSN: 1350-245X.

Ito, Y and Saito, H: "Free viewpoint image synthesis using uncalibrated multiple moving cameras" Computer Vision / Computer Graphics Collaboration Techniques and Applications (MIRAGE2005) Mar. 2, 2005, pp. 173-180, XP002608385 Retrieved from the Internet: URL:http://citeseerx.ist.psu.edu/viewdoc/summary?doi=10.1.1.81.5150 [retrieved on Nov. 1, 2010].

Thomas G A et al: "A versatile camera position measurement system for virtual reality TV production" Broadcasting Convention, 1997. IBS 97., International (Conf. Publ. 447) Amsterdam, Netherlands Sep. 12-16, 1997, London, UK,IEE, UK LNKD-DOI:10.1049/CP:19971284, Sep. 12, 1997, pp. 284-289, XP006508771 ISBN: 978-0-85296-694-5.

Nicola D'Apuzzo: 'Digitization of the Human Body in the Present-Day Economy: On the actual state of the technology and its exploitation for commercial applications', [Online] Apr. 5, 2004, XP55009675 Retrieved from the Internet: [retrieved on Oct. 17, 2011].

Gregor A. Kalberer; Luc Van Gool: 'Realistic face animation for speech,' The Journal of Visualization and Computer Animation, 2002, 13:97-106, DOI: 10.1002/vis.283.

* cited by examiner

DEVICE FOR GENERATING THREE DIMENSIONAL SURFACE MODELS OF MOVING OBJECTS

BACKGROUND OF THE INVENTION

1. Field of the Invention

The invention relates generally to apparatus and methods for generating three dimensional surface models of moving objects.

2. Background of the Invention

The generation of three dimensional models of moving objects has uses in a wide variety of areas, including motion pictures, computer graphics, video game production, human movement analysis, orthotics, prosthetics, surgical planning, sports medicine, sports performance, product design, surgical planning, surgical evaluation, military training, and ergonomic research.

Two existing technologies are currently used to generate these moving 3D models. Motion capture techniques are used to determine the motion of the object, using retro-reflective markers such as those produced by Motion Analysis Corporation, Vicon Ltd., active markers such as those produced by Charnwood Dynamics, magnetic field detectors such as those produced by Ascension Technologies, direct measurement such as that provided by MetaMotion, or the tracking of individual features such as that performed by Peak Performance, Simi. While these various technologies are able to capture motion, nevertheless these technologies do not produce a full surface model of the moving object, rather, they track a number of distinct features that represent a few points on the surface of the object.

To supplement the data generated by these motion capture technologies, a 3D surface model of the static object can be generated. For these static objects, a number of technologies can be used for the generation of full surface models: laser scanning such as that accomplished by CyberScan, light scanning such as that provided by Inspeck, direct measurement such as that accomplished by Direct Dimensions, and structured light such as that provided by Eyetronics or Vitronic).

While it may be possible to use existing technologies in combination, only a static model of the surface of the object is captured. A motion capture system must then be used to determine the dynamic motion of a few features on the object. The motion of the few feature points can be used to extrapolate the motion of the entire object. In graphic applications, such as motion pictures or video game production applications, it is possible to mathematically transform the static surface model of the object from a body centered coordinate system to a global or world coordinate system using the data acquired from the motion capture system.

All of these surface generation systems are designed to operate on static objects. Even when used in combination with a motion capture system, as described above, an object that is not a strictly rigid body is not correctly transformed from a body centered coordinate system, as a singles static surface models does not adequately represent the non rigid motion of the object. Therefore, there exists a need for a systems and methods that can produce a model of the surface a three dimensional object, with the object possibly in motion and the object possibly deforming in a non-rigid manner.

SUMMARY OF THE INVENTION

A device is needed that has the capability to operate on an object that is moving relative to the device while the device itself is possibly in motion. In order to achieve this goal, a novel device is provided wherein the optical characteristics of the device are under the control of an operator. In one embodiment a device that projects a pattern onto one aspect of the object is disclosed. The projection is in focus regardless of the distance between the object and the device, within a given range. In addition, the size of the pattern projected onto the object is under operator control. Furthermore, the imaging components of the device may also be under operator control, so that the zoom, focus, and aperture of the imaging components can be set to operate optimally, depending on where the object is in relation to the device.

BRIEF DESCRIPTION OF THE DRAWINGS

The drawings illustrate the design and utility of preferred embodiments of the invention, in which similar elements are referred to by common reference numerals and in which.

DETAILED DESCRIPTION

Various embodiments of the invention are described hereinafter with reference to the figures. It should be noted that the figures are not drawn to scale and elements of similar structures or functions are represented by like reference numerals throughout the figures. It should also be noted that the figures are only intended to facilitate the description of specific embodiments of the invention. The embodiments are not intended as an exhaustive description of the invention or as a limitation on the scope of the invention. In addition, an aspect described in conjunction with a particular embodiment of the invention is not necessarily limited to that embodiment and can be practiced in any other embodiment of the invention.

Figure 1:
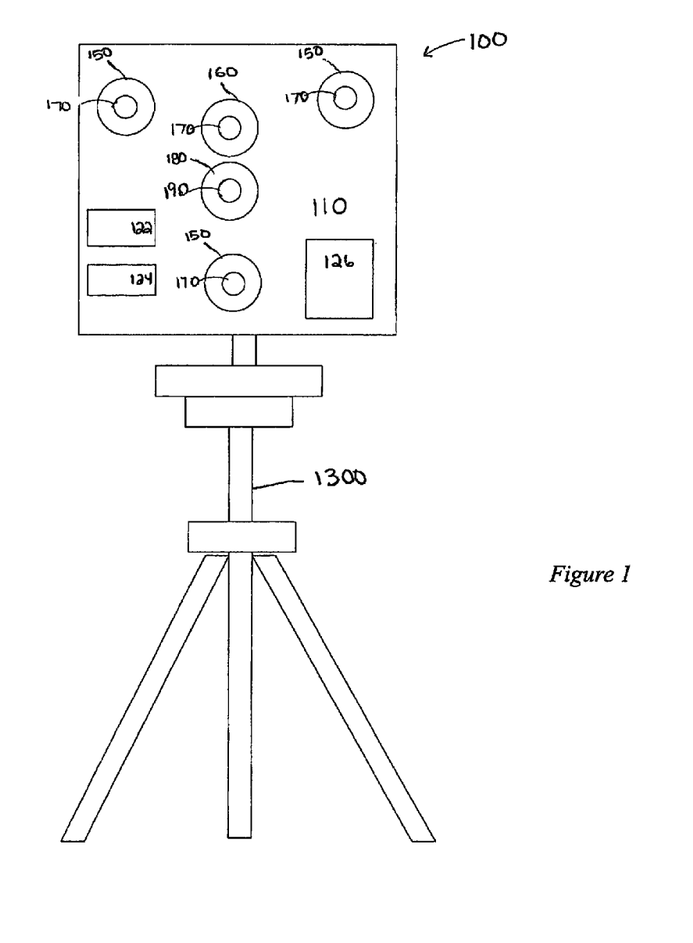
FIG. 1 is a front view of an imaging device.

Turning to the drawings, FIG. 1 is a front view of an imaging device 100. The imaging device is supported by a stand 1300. The imaging device 100 has a mounting panel 110. Contained within the mounting panel 110 of the imaging device 100 are grey scale digital video cameras 150. As illustrated in the present embodiment, there are three grey scale digital video cameras 150, however this number is not intended to be a limitation of the number of grey scale digital video cameras that may be contained in the mounting panel 110. There may be as few as two grey scale digital video cameras 150 and as many grey scale digital video cameras 150 as can be mounted on the mounting panel 110. The more digital video cameras that are incorporated, the more detailed the model generated is. The grey scale digital video cameras 150 may be time synchronized. The grey scale digital video cameras will be used in pairs to generate a 3D surface mesh of the subject, The mounting panel 110 may also contain a color digital video camera 160. The color digital video camera may be used to supplement the 3D surface mesh generated by the grey scale camera pair with color information. This color information allows for the direct generation of three dimensional models with color information derived from the actual object.

Each of the video cameras 150, 160 have lenses 170 with electronic zoom, aperture and focus control. Also contained within the mounting panel 110 is a projection system 180. The projection system 180 has a lens 190 with zoom and focus control. The projection system 180 allows an image, generated by the imaging device, to be cast on the object of interest, such as an actor or an inanimate object. The projection system could be a slide projector, which includes a light source, slide holder, slide or patterned glass, and lens(es), a liquid crystal display (LCD) projector, which includes a light source, one or three liquid crystal displays, and lens(es), a digital light processing (DLP) projector, which includes a light source, an array of micro-mirrors, and lens(es), or any other type of projector that allows an image to be projected on an object.

Control signals are transmitted to the imaging device 100 through a communications channel 122. Data is downloaded from the imaging device 100 through another communications channel 124. Power is distributed to the imaging device 100 through a power system 126. The power system 126 may be internal to the imaging device 100 or an external power system may be used. The imaging device 100 is controlled by a computer (not shown). The computer may be a remote computer for example a laptop, desktop or workstation, or the imaging device 100 may have an internal computer.

Figure 2:
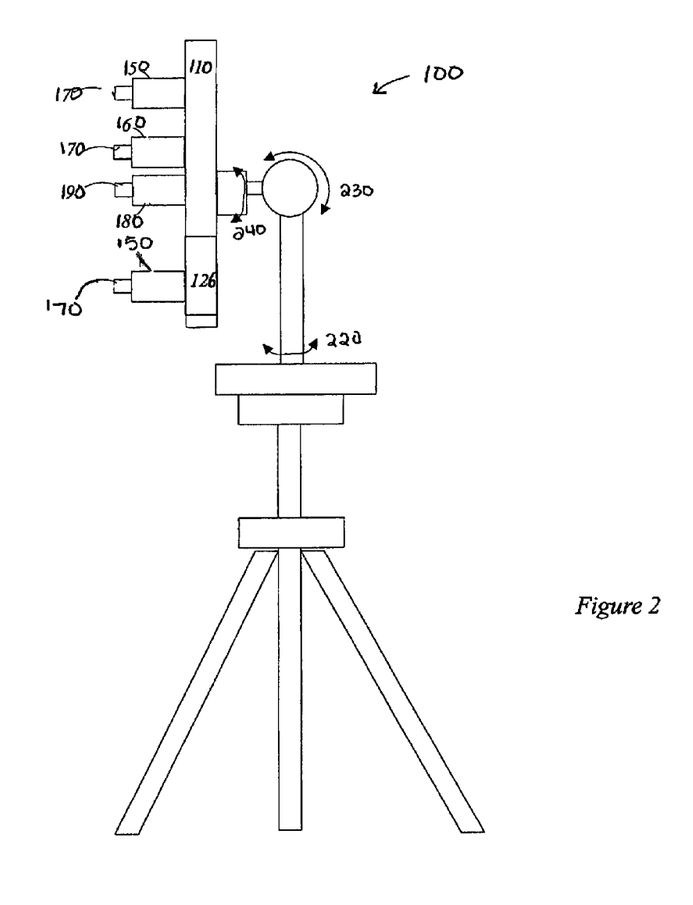
FIG. 2 is a side view of the imaging device of FIG. 1.

FIG. 2 is a side view of the imaging device 100 of FIG. 1. The imaging device 100 has orientation motors (not shown) that control the roll, pitch and yaw of the imaging device 100. One orientation motor may control multiple placements of the imaging device, or separate orientation motors may be utilized to control the various movements of the imaging device 100. As illustrated, an orientation motor controls the rotation of the imaging device 100 about its y-axis 220. The rotation about the y-axis is also known as the roll of the imaging device 100. Another orientation motor controls the rotation 230 of the imaging device 100 about its z-axis; this movement is known as the pitch of the imaging device 100. Still another orientation motor may control the rotation 240 of the imaging device 100 about its x-axis. The movement of the imaging device 100 about its x-axis is known as the yaw of the imaging device 100.

Figure 3:
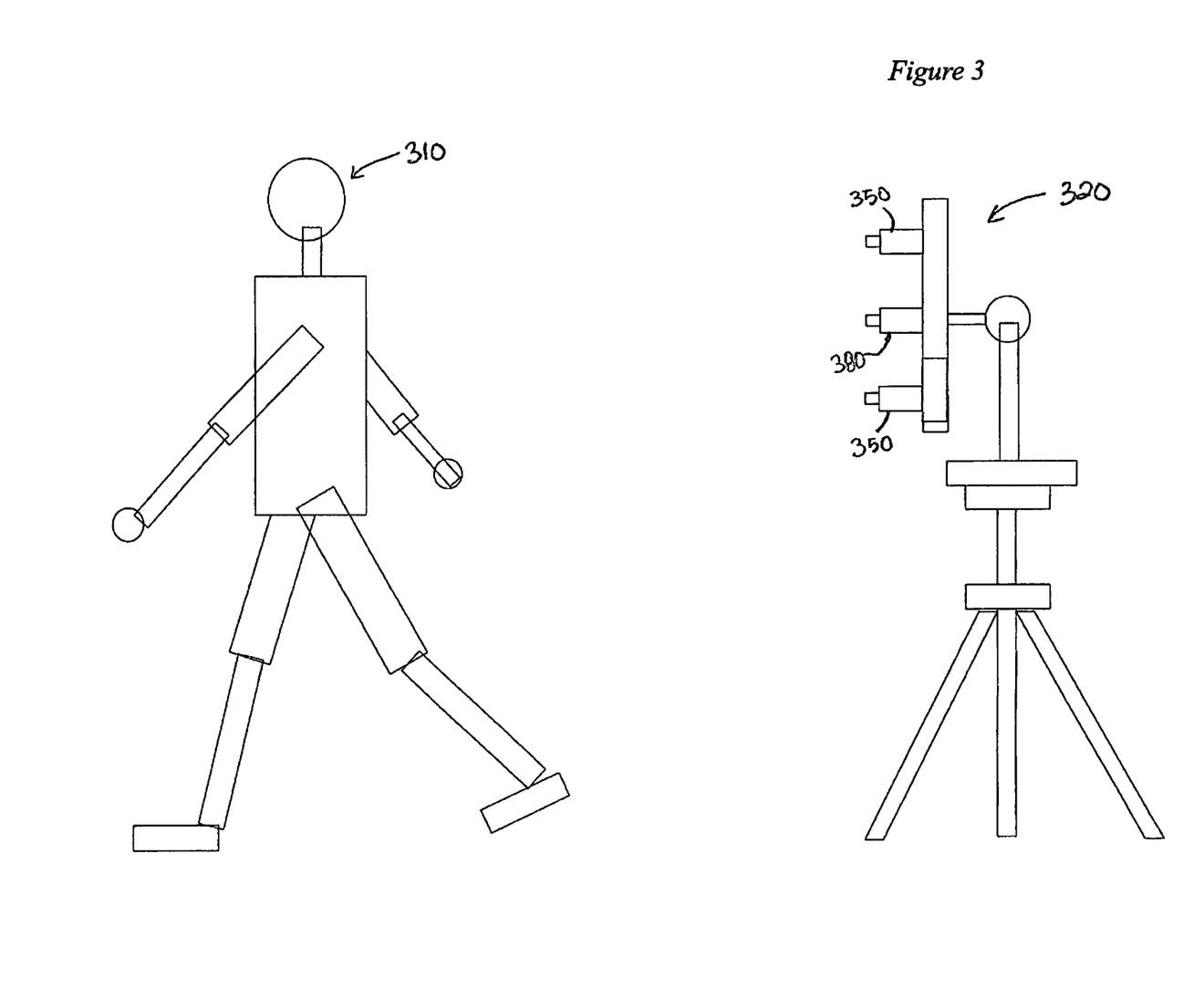
FIG. 3 illustrates an imaging device in operation.

FIG. 3 shows a subject 310 within the viewing range of an imaging device 320. The subject 310 is shown moving, alternatively, the subject 310 may be a moving object. For each frame, multiple control signals are sent to the imaging device 320. These control signals specify the roll, pitch, and yaw of the imaging device 320. Control signals also specify the zoom, focus, and aperture for each of the gray scale digital video cameras 350, and the zoom, focus, and aperture for the color digital video camera if one is included in the imaging device (not shown). Still another control signal specifies the zoom, focus, and aperture for the projection system 380. In addition the pattern to be projected by the projection system is also specified by a control signal.

Figure 4:
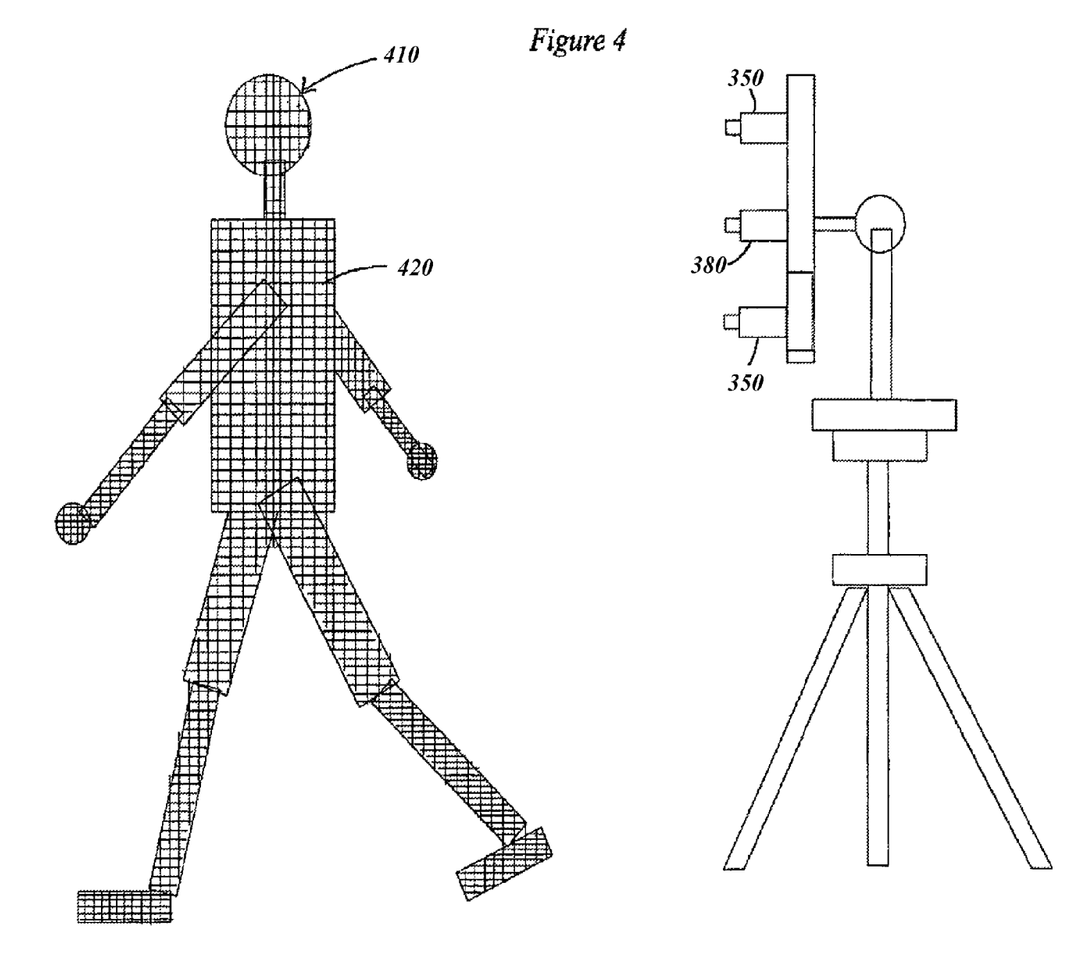
FIG. 4 illustrates an imaging device in operation with a projector activated.
Figure 5:
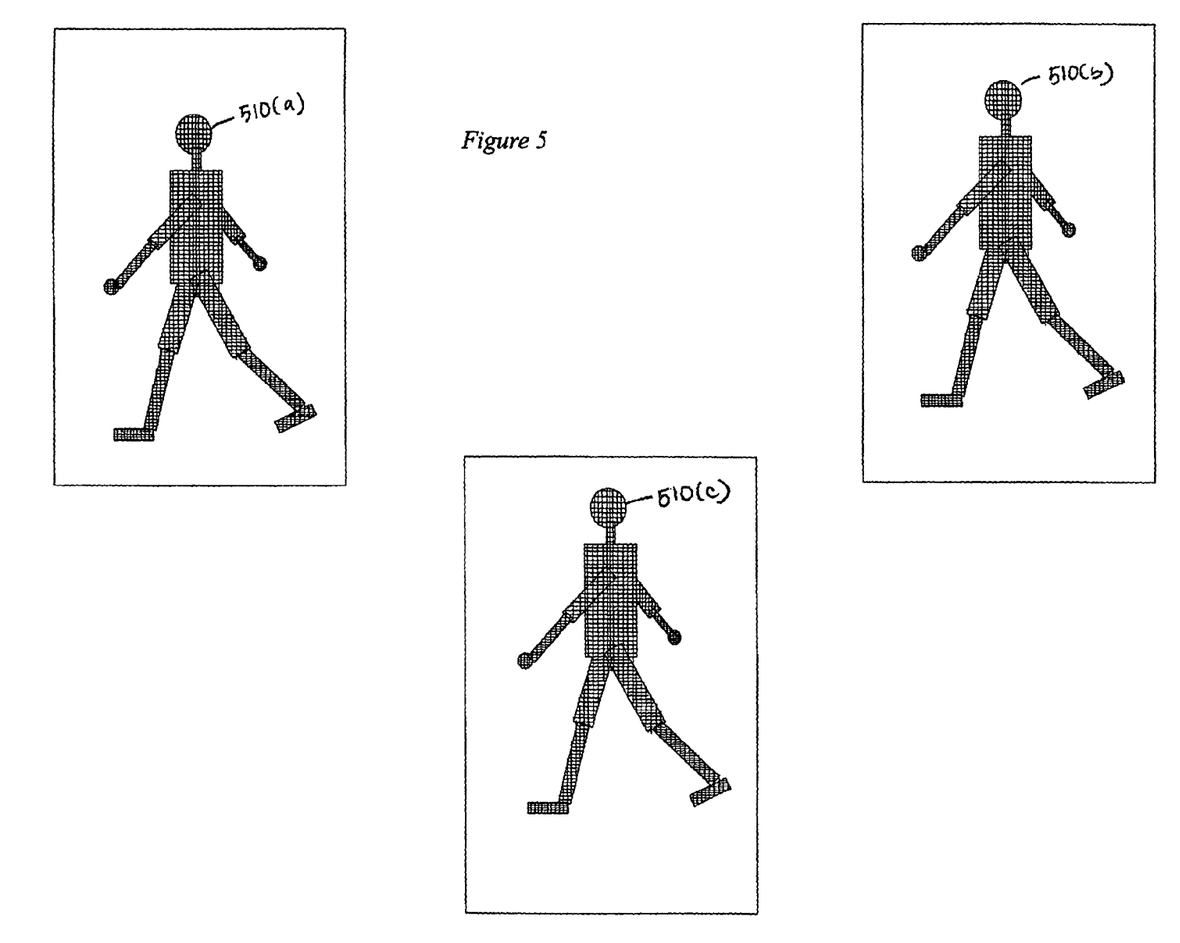
FIG. 5 illustrates an image as observed by grey scale cameras.
Figure 6:
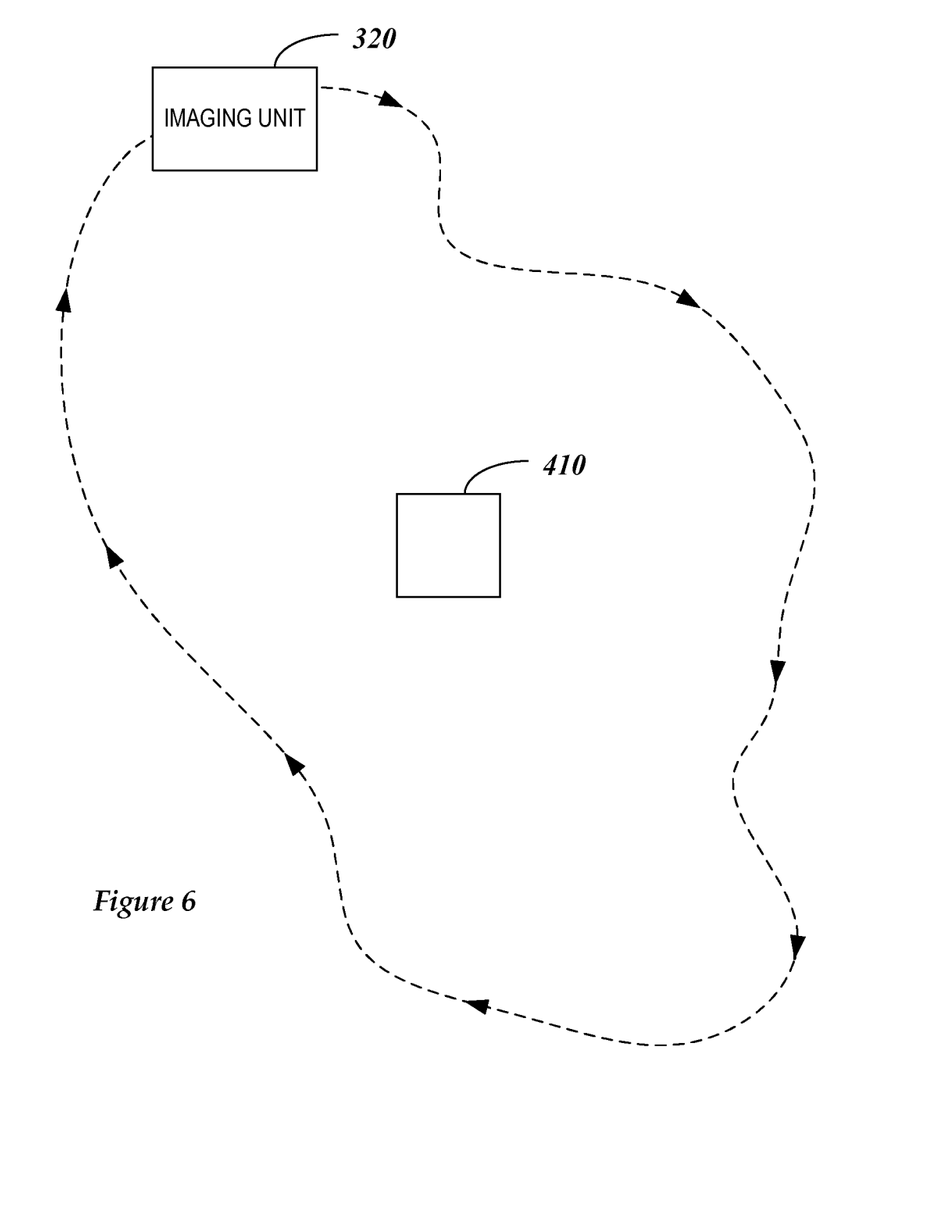
FIG. 6 illustrates an imaging device in operation moving around the subject.

After the imaging unit 320 is positioned and digital video cameras 350 and projection system 380 zoom, focus and aperture are set, a trigger signal is sent through the control channel. The trigger signal causes the projector to turn on, projecting the desired pattern 420 out into the viewing volume and onto a subject 410 as illustrated in FIG. 4. A delayed trigger signal is then sent to each of the digital video cameras 350 and each of the digital video cameras captures an image. The image will be of the three dimensional object with the projected pattern superimposed on the object as illustrated in FIG. 5. These images 510 (*a*)-(*c*) are then transmitted from the imaging unit to a computer. This completes a single frame and the imaging device is now is now ready for the next cycle of operation. The process of capturing data continues, depending on the desired application. For example, if a model of the subject is being built, the cameras 350 on the imaging unit 320 would be moved around the subject 410, acquiring data, until a complete mesh was acquired as illustrated in FIG. 6. If the application involves tracking the subject in real-time, the data acquisition would run continuously. If the activity is over some specified time interval, say for example a scene, the imaging device would record until stopped by the operator.

A computer, either external or internal to the imaging device as described above, reads these images of the object with the superimposed pattern. For each of the various camera images, the pattern features are detected. One approach that may be used for the pattern detection is a mesh extraction technique such as that described in Bayesian Grid Matching, *IEEE Transactions on Pattern Analysis and Machine Intelligence*, Vol. 25, No. 2, February 2003, pp. 162-173 by K. Hartelius, and J. M. Carstensen, which is hereby incorporated by reference in its entirety. In this algorithm, the projection pattern is a grid of black lines on a clear background. Since the pattern is known, it is possible using computer vision techniques to quickly extract these features.

Once the features are extracted from all of the digital video cameras on the imaging device, the features can be corresponded (that is, features on the object observed in one camera image are related to the same features as observed in another camera) across the digital video cameras. Corresponding the features can be accomplished in a variety of ways. One such approach is to make a number of the features distinct from the rest of the feature field. These features are detected in each of the digital video cameras and serve as a template for corresponding the rest of the features. Another approach uses a technique know as maximization of mutual information as detailed in "Multi-modality image registration by maximization of mutual information", *Mathematical Methods in Biomedical Image Analysis*. IEEE Computer Society Press, 1996, by A. Maes, et al., (the "Maes technique") which is incorporated herein by reference in its entirety. Using the Maes technique, equation 1 below is calculated for each of the possible correspondence patterns.

$$MI(X,Y)=H(X)+H(Y)-H(X,Y) \quad (1)$$

Where MI is the mutual information between image X and image Y, H(X) and H(Y) are the entropies of images X and Y respectively, and H(X,Y) is the joint entropy of the two images. The correspondence pattern that maximizes the mutual information indicates the correct correspondence pattern. The mutual information in this case is taken as a measure for the efficacy of the correspondence between images. When the two images are correctly matched, the mutual information will be maximized.

Once the features have been corresponded, the known relative positions of the digital video cameras can be used to calculate the three dimensional location of the feature points detected in more than one digital video camera. There are multiple approaches to performing this three dimensional location determination. One such approach as explained below is commonly known as the DLT technique and is detailed in Direct Linear Transformation from Comparator Coordinates into Object Space Coordinates in Close-Range Photogrammetry (1971) by Y. I. Abdel-Aziz, Y. I. and H. M. Karara. Proceedings of the Symposium on Close-Range Photogrammetry (pp. 1-18). Falls Church, Va.: American Society of Photogrammetry.

Using the DLT technique, for each of the feature points detected in more than one digital video camera, a set of simultaneous equations is set up. These equations are:

$$\begin{bmatrix} \frac{v^{(1)}L_9^{(1)} - L_1^{(1)}}{R^{(1)}} & \frac{v^{(1)}L_{10}^{(1)} - L_2^{(1)}}{R^{(1)}} & \frac{v^{(1)}L_{11}^{(1)} - L_3^{(1)}}{R^{(1)}} \\ \frac{\omega^{(1)}L_9^{(1)} - L_5^{(1)}}{R^{(1)}} & \frac{\omega^{(1)}L_{10}^{(1)} - L_6^{(1)}}{R^{(1)}} & \frac{\omega^{(1)}L_{11}^{(1)} - L_7^{(1)}}{R^{(1)}} \\ \vdots & \vdots & \vdots \\ \frac{v^{(m)}L_9^{(m)} - L_1^{(m)}}{R^{(m)}} & \frac{v^{(m)}L_{10}^{(m)} - L_2^{(m)}}{R^{(m)}} & \frac{v^{(m)}L_{11}^{(m)} - L_3^{(m)}}{R^{(m)}} \\ \frac{\omega^{(m)}L_9^{(m)} - L_5^{(m)}}{R^{(m)}} & \frac{\omega^{(m)}L_{10}^{(m)} - L_6^{(m)}}{R^{(m)}} & \frac{v^{(m)}L_{11}^{(m)} - L_7^{(m)}}{R^{(m)}} \end{bmatrix} \begin{bmatrix} x \\ y \\ z \end{bmatrix} = \begin{bmatrix} \frac{L_4^{(1)} - v^{(1)}}{R^{(1)}} \\ \frac{L_8^{(1)} - \omega^{(1)}}{R^{(1)}} \\ \vdots \\ \frac{L_4^{(m)} - v^{(m)}}{R^{(m)}} \\ \frac{L_8^{(m)} - \omega^{(m)}}{R^{(m)}} \end{bmatrix} \quad (2)$$

Where X,Y,Z are the 3D coordinates of the point, $L_1$-$L_{11}$ are the direct linear transform parameters determined from digital video camera calibration, m is the number of digital video cameras, $u^{(i)}$ and $w^{(i)}$ are the pixel coordinates of the feature in digital video camera i, and $R^{(i)}$ is given by $$R^{(i)} = L_9^{(i)}x + L_{10}^{(i)}y + L_{11}^{(i)}z + 1 \quad (3)$$

Figure 7:
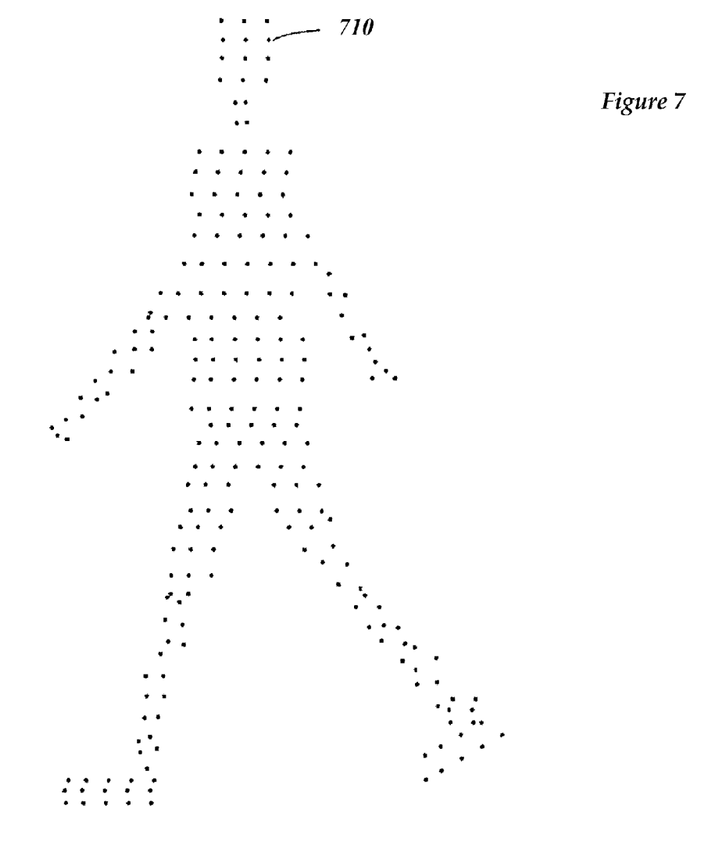
FIG. 7 illustrates a reconstructed three dimensional surface mesh of a subject.

A simultaneous equation solving technique (such as the linear least squares technique) is used to determine the unknowns in these equations. The solution to these equations is the three dimensional location of the feature point. This procedure is repeated for all of the points detected by more than one digital video camera. This produces a cloud of three dimensional points 710 representing a model of the surface of the three dimensional object as illustrated in FIG. 7.

Any of a large number of data processing algorithms can be applied to this cloud of points 710 to calculate a surface model more amenable to the specific task. One approach would be to fit a spline surface through this cloud of points 710. Another approach is to use a cluster of super-quadrics. Regardless of which of these point cloud to surface algorithms are used, the essential task of constructing a model of one aspect of the three dimensional surface is complete.

The embodiments described herein have been presented for purposes of illustration and are not intended to be exhaustive or limiting. Many variations and modifications are possible in light of the forgoing teaching. The system is limited only by the following claims.

What is claimed:

1. A method for generating a three dimensional surface model of an object comprising:
   projecting, by an imaging device, a pattern onto an object, wherein the imaging device is located at a first location, and the imaging device is at a first relative distance to the object;
   obtaining, by the imaging device at the first location, a first image of the object having the pattern superimposed on the object, wherein the imaging device is capable of being moved around the object to capture images from different perspectives;
   transmitting the first image to a computer;
   detecting pattern features in the image;
   projecting, by the imaging device, the pattern onto a different portion of the object, wherein the imaging device is located at a second location different from the first location, and the imaging device is a second relative distance to the object different from the first relative distance;
   obtaining, by the imaging device at the second location, a second image of the object having the pattern superimposed on the different portion of the object, wherein the camera changes zoom and focus between the first and second locations;
   corresponding the pattern features in the first image with pattern features in the second image;
   calculating the coordinates of points on the pattern features; and
   generating a three dimensional model from the coordinates.

2. The method of claim 1, wherein at least two images of the object with the pattern superimposed on the object are obtained from different perspectives at each of the first location and the second location.

3. The method of claim 2, wherein the steps of detecting pattern features, corresponding the pattern features and calculating the coordinates of the pattern features are repeated for the at least two images obtained at each of the first location and the second location.

4. The method of claim 2, further comprising sending control signals to the imaging device.

5. The method of claim 1, wherein the imaging device comprises at least two video cameras, each video camera for capturing an image from one of the different perspectives at each of the first location and the second location.

6. The method of claim 5, wherein at least one of the video cameras is a color video camera for generating the three dimensional model with color information.

7. The method of claim 5, wherein the video cameras are grey scale digital video cameras.

8. The method of claim 7, wherein the video cameras are time synchronized.

9. The method of claim 1, wherein the object is a moving object.

10. The method of claim 1, wherein the imaging device further comprises an orientation motor that controls one or more of pitch, roll, or yaw of the imaging device.

11. A system for generating a three dimensional surface model of an object comprising:
    an imaging device comprising a camera, said imaging device configured to perform the steps of:
       projecting a pattern onto an object, wherein the imaging device is located at a first location, and the imaging device is at a first relative distance to the object;
       obtaining, at the first location, a first image of the object having the pattern superimposed on the object, wherein the imaging device is capable of being moved around the object to capture images from different perspectives;
       transmitting the first image to a computer;
       projecting the pattern onto a different portion of the object, wherein the imaging device is located at a second location different from the first location, and the imaging device is a second relative distance to the object different from the first relative distance;
       obtaining, at the second location, a second image of the object having the pattern superimposed on the different portion of the object, wherein the camera changes zoom and focus between the first and second location;
       transmitting the second image to the computer; and said computer comprising one or more processors and having one or more sets of instructions, which when executed by the one or more processors, performs the steps of:

detecting pattern features in the first image and the second image;

corresponding the pattern features in the first image with pattern features in the second image;

calculating the coordinates of points on the pattern features; and generating a three dimensional model from the coordinates.

12. The system of claim 11, wherein at least two images of the object with the pattern superimposed on the object are obtained from different perspectives at each of the first location and the second location.

13. The system of claim 12, wherein the steps of detecting pattern features, corresponding the pattern features and calculating the coordinates of the pattern features are repeated for the at least two images obtained at each of the first location and the second location.

14. The system of claim 12, the computer configured to send control signals to the imaging device.

15. The system of claim 11, wherein the imaging device comprises at least two video cameras, each video camera for capturing an image from one of the different perspectives at each of the first location and the second location.

16. The system of claim 15, wherein at least one of the video cameras is a color video camera for generating the three dimensional model with color information.

17. The system of claim 15, wherein the video cameras are grey scale digital video cameras.

18. The system of claim 17, wherein the video cameras are time synchronized.

19. The system of claim 11, wherein the object is a moving object.

20. The system of claim 11, wherein the imaging device further comprises an orientation motor that controls one or more of pitch, roll, or yaw of the imaging device.

* * * * *